US012576408B2

(12) United States Patent
Stollings

(10) Patent No.: US 12,576,408 B2
(45) Date of Patent: Mar. 17, 2026

(54) APPARATUS AND METHOD FOR VORTEX AIR FLOW MATERIAL GRINDING

(71) Applicant: Drema Stollings, Charleston, WV (US)

(72) Inventor: James Daniel Stollings, Charleston, WV (US)

( * ) Notice: Subject to any disclaimer, the term of this patent is extended or adjusted under 35 U.S.C. 154(b) by 376 days.

(21) Appl. No.: 17/902,436

(22) Filed: Sep. 2, 2022

(65) Prior Publication Data

US 2023/0072144 A1 Mar. 9, 2023

Related U.S. Application Data

(60) Provisional application No. 63/241,023, filed on Sep. 6, 2021.

(51) Int. Cl.
*B02C 19/06* (2006.01)

(52) U.S. Cl.
CPC .................................. *B02C 19/061* (2013.01)

(58) Field of Classification Search
CPC ..... B02C 19/061; B02C 19/06; B02C 19/068; B02C 19/963; B02C 19/065; B02C 23/24
USPC ............................................................ 241/18
See application file for complete search history.

(56) References Cited

U.S. PATENT DOCUMENTS 4,248,387 A * 2/1981 Andrews ............... B02C 19/061 241/39
4,428,535 A * 1/1984 Venetucci ............. B02C 19/186 241/35
5,203,511 A * 4/1993 Ondush ................... B02C 13/14 241/23
6,179,231 B1 * 1/2001 Csendes .................. B02C 13/18 241/97
6,971,594 B1 12/2005 Polifka
(Continued)

FOREIGN PATENT DOCUMENTS

CN 105621849 * 6/2016 ........... B02C 19/061
CN 106334614 * 1/2017 ......... B02C 19/0012
(Continued)

OTHER PUBLICATIONS

Liu Yuying; Zhou Yanqin; Xu Xiongfei; Ling Zhuangkun, An Ultramicro Powder-type Air Stream Grinder, Oct. 15, 2019, (Year:2019) (Year: 2019).*
(Continued)

*Primary Examiner* — Bobby Yeonjin Kim
(74) *Attorney, Agent, or Firm* — Stites & Harbison, PLLC; Terry L. Wright

(57) ABSTRACT

A vortex air flow material grinding apparatus includes a cylindrical lower chamber with an open interior. An inverted conical-shaped upper chamber is connected to the lower chamber, and an air knife assembly is connected to an annular side wall of the lower chamber to thereby inject air into the open interior of the lower chamber and create a vortex air flow in the lower chamber that extends upward into the upper chamber. Methods for grinding a material are further provided in which a material is first introduced into the apparatus. An amount of compressed air is then injected into the circular lower chamber to create an air vortex where material entrained in the air vortex tumbles against itself and is pulverized. The material in the air vortex can then be processed for a period of time sufficient to pulverize the material to a desired size.

19 Claims, 4 Drawing Sheets

(56) References Cited

U.S. PATENT DOCUMENTS

| | | | | |
|---|---|---|---|---|
| 7,258,290 | B2 * | 8/2007 | Taketomi | B02C 19/063 241/40 |
| 12,179,216 | B2 | 12/2024 | Stollings et al. | |
| 2003/0155454 | A1 * | 8/2003 | Beliavsky | B02C 19/061 241/39 |
| 2008/0048058 | A1 * | 2/2008 | Ito | B02C 19/061 241/5 |
| 2008/0054106 | A1 * | 3/2008 | Zehavi | B02C 19/061 501/154 |
| 2015/0343453 | A1 * | 12/2015 | Czekai | B02C 23/16 241/39 |
| 2016/0279643 | A1 * | 9/2016 | Müller-siebert | B02C 25/00 |
| 2020/0331001 | A1 * | 10/2020 | Albus | B02C 19/061 |
| 2022/0134354 | A1 | 5/2022 | Stollings et al. | |

FOREIGN PATENT DOCUMENTS

| | | | | |
|---|---|---|---|---|
| CN | 109806531 | * | 5/2019 | A62C 3/04 |
| CN | 209519872 U | * | 10/2019 | |
| CN | 110813479 | * | 2/2020 | B02C 19/06 |
| CN | 111604003 A | * | 9/2020 | A01M 9/0007 |
| KR | 20200059785 | * | 5/2020 | B02C 19/06 |
| WO | WO 2012014985 | * | 2/2012 | B02C 19/06 |

OTHER PUBLICATIONS

Xia Tiancheng; Ma Sijie, Pesticide Powder Suitable For Unmanned Airplane Spraying And Preparation Method And Production Device Thereof, Sep. 1, 2020, (Year: 2020) (Year: 2020).*

* cited by examiner

APPARATUS AND METHOD FOR VORTEX AIR FLOW MATERIAL GRINDING

RELATED APPLICATIONS

This application claims priority from U.S. Provisional Application Ser. No. 63/241,023, filed Sep. 6, 2021, the entire disclosure of which is incorporated herein by this reference.

TECHNICAL FIELD

The present invention generally relates to material grinding and, more particularly, to an apparatus and method for vortex air flow material grinding in which the size of solids or aggregates of igneous, sedimentary, and metamorphic rocks, minerals or mineraloid matter, and other materials containing rare earth and other valuable elements and compounds are reduced by grinding, pulverizing, and micronizing the materials so that the elements and compounds contained in the materials can be classified, separated, and extracted.

BACKGROUND

As a result of recently developed methods and technologies, igneous, sedimentary, and metamorphic rocks, clays, ash, coal, and coal byproducts have been identified as promising sources of rare earth elements, precious metals, and other valuable elements and compounds. Rare earth elements, including yttrium, scandium, and the lanthanide series of elements, are a group of seventeen elements that have similar chemical and physical properties. These elements are scarce due to their geochemical properties, which render them unlikely to be found in large deposits, but the elements still have high value due to their increased usage in a variety of modern technologies. Precious metals, including gold and silver, and other elements and compounds, including lithium, also have high value due to their usage in commercial and consumer products. Thus, new and improved devices, systems, and methods for extracting these valuable materials from igneous, sedimentary, and metamorphic rocks, clays, ash, coal, coal byproducts, and other composite materials of any kind in which they are found would be both highly desirable and beneficial.

SUMMARY

The present invention includes an apparatus and method for circular vortex air flow material grinding.

Mineral processing requires separation of particles containing minerals, elements, and compounds by size, specific gravity, and other chemical and physical properties. Igneous, sedimentary, and metamorphic rocks and other materials containing rare earth elements and compounds which have been pulverized to a powder or dust are suitable for economical, efficient, and simple classification, separation, and extraction of valuable components by specific gravity, magnetic properties, air classification, liquid flotation, and other chemical and physical methods. The percentage of rare earth minerals and other valuable elements and compounds that can be classified, separated, and extracted from igneous, sedimentary, and metamorphic rocks, clays, ash, coal, coal byproducts, and other composite materials is inversely related to the size of the particles containing the elements and compounds. As the size of the particles containing valuable elements and compounds decreases, the percentage that can be classified, separated, and extracted increases.

The percentage of rare earth and other valuable elements and compounds that can be classified, separated, and extracted from raw materials is increased by twenty to eighty percent or greater when particle sizes are reduced to approximately 325 mesh (44 μm) or less. However, prior to the present invention, no existing device or method was capable of optimal economic reduction of raw materials to 200 mesh (74 μm) or less for the classification, separation, and extraction from igneous, sedimentary, and metamorphic rocks, clays, ash, coal, coal byproducts, and other composite materials. In this regard, the apparatus described herein, which can also be referred to as a nano-pulverizer, improves on and is believed to be superior to all existing devices and methods in the economical, efficient, and simplified grinding, pulverizing, and reduction in the size of raw material containing elements and minerals, including rare earth elements, to, in some embodiments approximately 325 mesh, 44 μm or less. The presently-described apparatuses and methods are also advantageous in that the apparatus and methods have little to no detrimental impact on the environment.

In some embodiments of the present invention, an improved airflow vortex grinding apparatus is provided that operates by injecting air at greater pressure than existing devices and methods to create a cyclonic air flow, with higher velocity and force than existing devices and methods are capable of creating. This cyclonic air flow is created within an enclosed cylindrical shaped lower chamber which, in turn, creates an airflow vortex in an inverted conical-shaped upper chamber having the largest diameter of the conical upper chamber attached to the cylindrical lower chamber. The inverted conical-shaped upper chamber then progressively narrows toward the topmost end, thereby increasing the concentration of desired valuable elements and compounds and increasing the efficiency of classification, separation, and extraction. The apparatus also comprises a support structure supporting any number of upper and lower enclosures in an upright orientation such that upper and lower interior chambers are in a vertical tandem orientation with one another.

In one particular embodiment of a vortex air flow material grinding apparatus made in accordance with the present invention, an apparatus is provided that includes a cylindrical lower chamber having an annular side wall, an upper surface, and a lower surface. The annular side wall, the top surface, and the bottom surface of the lower chamber collectively define an open interior of the lower chamber, with the upper surface of the lower chamber then further defining a central opening. An upper chamber including a conical sidewall defining an upper opening and a lower opening is then operably connected to and in fluid communication with the central opening of the lower chamber. The upper chamber can be described as having an inverted conical shape as the lower opening of the upper chamber has a greater circumference than the upper opening of the upper chamber.

To inject air into the apparatus and more specifically, into the open interior of the lower chamber, one or more air knife assemblies are operably connected to the annular side wall of the lower chamber and are configured such that, upon injecting air into the open interior of the lower chamber, the injection of air creates a vortex air flow in the lower chamber that extends upward into the upper chamber. In some embodiments of the apparatus, an exemplary air knife assembly includes an air injection plate and one or more air injection nozzles, as well as an adjustable tap to modify a flow of air into the open interior of the lower chamber.

To introduce material into the apparatus, the upper surface of the lower chamber further includes one or more air locked openings for delivering material directly into the open interior of the lower chamber. Generally, the one or more air locked openings are positioned on the upper surface of the lower chamber proximate to the annular side wall of the lower chamber. In certain embodiments, each of the one or more air locked openings comprises a rotary valve. A control valve can then be operably connected to the upper opening of the upper chamber to thereby allow ground material to exit the apparatus, and a conduit can be operably connected to the upper opening of the upper chamber and to the control valve to thereby further transport ground or pulverized material away from the apparatus.

In one exemplary implementation of a method for grinding a material in accordance with the present invention, a method for grinding a material is provided that includes an initial step of introducing a material into an apparatus including a circular lower chamber and an inverted conical-shaped upper chamber, such as what is found in the exemplary embodiment described above. An amount of compressed air is then injected into the circular lower chamber to create an air vortex in the lower chamber that extends upwardly into the inverted conical-shaped upper chamber. In this way, the material that was introduced into the circular lower chamber and that is entrained in the air vortex is made to tumble against itself and is pulverized. The material in the air vortex is then processed for a period of time sufficient pulverize the material to a desired size and, subsequent to such processing the material in the air vortex, the material can be removed from the opening in the upper chamber.

In certain implementations, prior to introducing the material into the apparatus, the materials can be pre-crushed to facilitate the pulverizing process. In some implementations, subsequent to processing the material in the air vortex, the material has a diameter of less than about 325 μm, such as, in certain implementations, a diameter of about 37 μm to about 250 μm.

By making use of the apparatus and methods described herein, a number of materials can be effectively and efficiently ground to allow for the subsequent extraction of rare earth elements and compounds. Raw materials capable of being processed in accordance with the present invention can include coal, clay, or rock materials. In some implementations, the material is selected from the group consisting of carbonite materials, alkaline igneous materials, ion-adsorption clay deposits, and monazite-xenotime-bearing placer deposits. In some implementations, the material comprises coal.

Further features and advantages of the present invention will become evident to those of ordinary skill in the art after a study of the description, figures, and non-limiting examples in this document.

DESCRIPTION OF EXEMPLARY EMBODIMENTS

Figure 1:
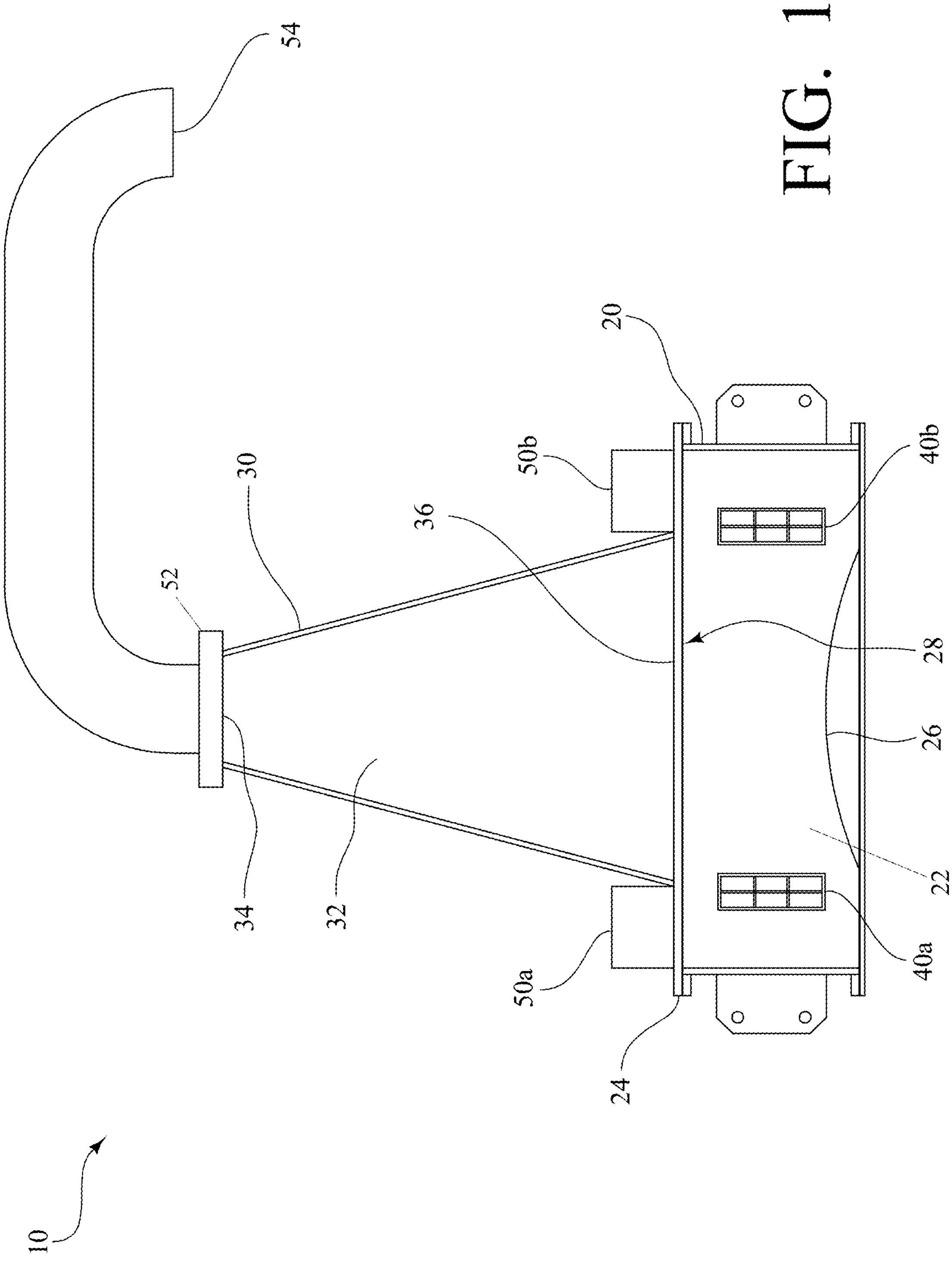
FIG. 1 is side view of a vortex air flow material grinding apparatus made in accordance with the present invention.

The present invention includes an apparatus and method for circular vortex air flow material grinding. The class of devices known as vortex air flow grinders typically operate by introducing raw materials into a generally cylindrical upper chamber and then injecting air at high pressure and velocity into the chamber. The resulting pressure differential and air flow dynamics, in turn, creates an airflow vortex, similar to that seen in tornados, which typically extends downward into a conical, funnel shaped, lower chamber. Particles are entrained in the cyclonic air flow and collide with each other, thereby reducing the size of the particles. Repeated impact of the particles when the particles collide is the primary, but not sole mechanism, that then causes a grinding and pulverizing effect. Particles colliding with walls and protrusions; symmetric and asymmetric baffles; air injection design and orientation; airflow fluid dynamics; anisothermal airflow patterns; introduction of ultrasonic and magnetic enhancement mechanisms; and other physical mechanisms can also contribute to the reduction in size. However, the relative reduction in size is determined primarily by the particle composition and density, particle size distribution, tangential velocity distributions, duration of processing, air pressure and velocity, cyclonic device design and dimensions, and other variables which effect the grinding and pulverizing process. One known form of vortex air flow grinder is disclosed in U.S. Pat. No. 5,236,132, granted to Frank Rowley, Jr. on Aug. 17, 1993, with another known form disclosed in U.S. Pat. No. 6,971,594, issued on Dec. 6, 2005, to Francis D. Polifka, the contents of which are hereby incorporated by reference in their entirety.

The embodiments described herein are typically described with respect to crushing and pulverizing material from the coal, clay, and rock extracted by techniques utilized in the mining of coal. However, one of ordinary skill in the art will appreciate that the apparatuses, systems, and methods disclosed herein can be applied to crushing and pulverizing material containing rare earth elements and compounds and other valuable elements, compounds, and minerals from raw material other than coal, clay, and/or rock. For instance, raw material may include carbonites, of which coal is a member. Raw material may also include alkaline igneous systems, ion adsorption clay deposits, monazite-xenotime-bearing placer deposits, or other igneous, sedimentary, and metamorphic rocks.

As indicated above, in existing forms, a vortex air flow grinder typically includes: a conical, ring shaped, upper chamber into which material to be ground is fed through the top; one or more air injection inlets in the upper enclosure for introduction of compressed air into the chamber, which then generates a relatively high velocity vortex flow of air in the upper chamber; and a conical lower enclosure which is a downward continuation and extension of the upper chamber into which material entrained in the airflow is introduced into a cyclonic airflow vortex. Particles entrained in the cyclonic airflow subsequently collide into adjacent particles, causing a progressive reduction of size.

With that in mind, in the apparatuses and methods made in accordance with the present invention, raw material such as igneous, sedimentary, and metamorphic rocks, clays, ash, coal, coal byproducts, and other composite materials of any kind in which rare earth and other valuable elements and compounds are found, is first typically crushed to an appropriate size of 2×0 inch or less utilizing jaw, gyratory, roll, impact, and hammer crushers and mills before introduction into the presently-described apparatuses of the present invention (e.g., the nano-pulverizer).

In some embodiments of the present invention, and as described in further detail below, an apparatus made and utilized in accordance with the present invention can be described as including: (a) a vertically oriented upper annular, cylindrical, enclosure defining an upper chamber with an upper opening into which raw material is fed and a lower opening attached to one or more lower chambers; (b) a lower enclosure defining a lower chamber in tandem with the upper chamber, the lower chamber having a conical configuration and open upper and lower ends, the open lower end of the upper chamber and the upper open end of the lower attached such that there is substantially continuous airflow communication between the upper chamber and lower chamber; (c) a means for delivering material to be ground into the upper chamber through the upper end thereof; (d) a means for supplying a flow of air in a compressed state, injected at greater pressure than existing devices, through one or more holes or openings in the sidewall of the upper chamber to which air injection laminar flow and deflection devices, similar in design to and referenced herein as air knives are attached, creating an airflow path, having a greater velocity than that which can be generated by existing devices, extending about the interior of the upper annular sidewall; (e) a means for exhausting air from the upper chamber through the upper end thereof such that the means for supplying air and the means for exhausting air interact with the air injection mechanism in the upper annular sidewall and with the upper and interior chambers to create a circular vortex flow of air within the upper and lower chambers; (f) that causes grinding and drying of material, substantially in the upper chamber, exhausting of air from the upper chamber of the upper enclosure through the upper end thereof, downward travel of ground material through the lower chamber, and downward discharge of the ground material from the lower chamber through the lower opening.

The above-described vortex air flow grinder made in accordance with one embodiment of the present invention is suitable for grinding and pulverizing materials. In an alternative embodiment of the present invention, however, a vortex air flow grinder is provided that is more economical and efficient. In such alternative embodiments, the existing configuration of vortex airflow grinders is inverted and additional mechanisms that improve grinding and pulverization are further introduced. For instance, in such alternative embodiments and as described in further detail below, a further apparatus made in accordance with the present invention can be described as including: (a) a vertically oriented lower annular, cylindrical, enclosure or lower chamber, having one or more valved or otherwise air locked openings located in proximity to the outer circumference and into which raw material is fed; (b) a dome shaped base plate on the lower end of the lower chamber; (c) an upper opening in the lower chamber attached to one or more upper enclosures; (d) an upper enclosure defining an upper chamber in tandem with the lower chamber, the upper chamber having an inverted conical configuration and openings in the upper and lower ends, the conical sidewall having the greatest circumference being mounted at the open upper end of the lower chamber such that there is substantially continuous airflow communication between the lower chamber and the upper chamber; (e) a means for delivering material to be ground into the lower chamber through one or more valved or otherwise air locked openings; (f) a means for supplying a flow of air in a compressed state with higher pressure than existing devices (typically 300 to 2200 cubic feet per minute), through one or more holes to which air injection laminar flow and deflection devices, similar in design to and referenced herein as air knives, are attached in the annular sidewall of the lower chamber, creating an airflow path extending about the interior of the lower annular sidewall having higher velocity (which in some configurations may approach 300 meters per second or greater) than existing devices are capable of generating; and (g) a means for exhausting air from the upper chamber through the upper end thereof such that the means for supplying air and the means for exhausting air interact with the air injected in the lower chamber to create a circular vortex flow of air within the lower and upper chambers that causes grinding and drying of material in the lower and upper chambers, withdrawal of air from the upper chamber of the upper enclosure through the upper end thereof, resulting in upward travel of ground material from the lower chamber through the open upper end of the lower chamber to be extracted by opening a valve or size classification mechanism such as an air classifier utilizing the Coanda effect, at the upper end of the upper chamber, allowing pulverized material to exit the apparatus into a collection device for further classification, separation, and extraction of desired products.

Figure 2:
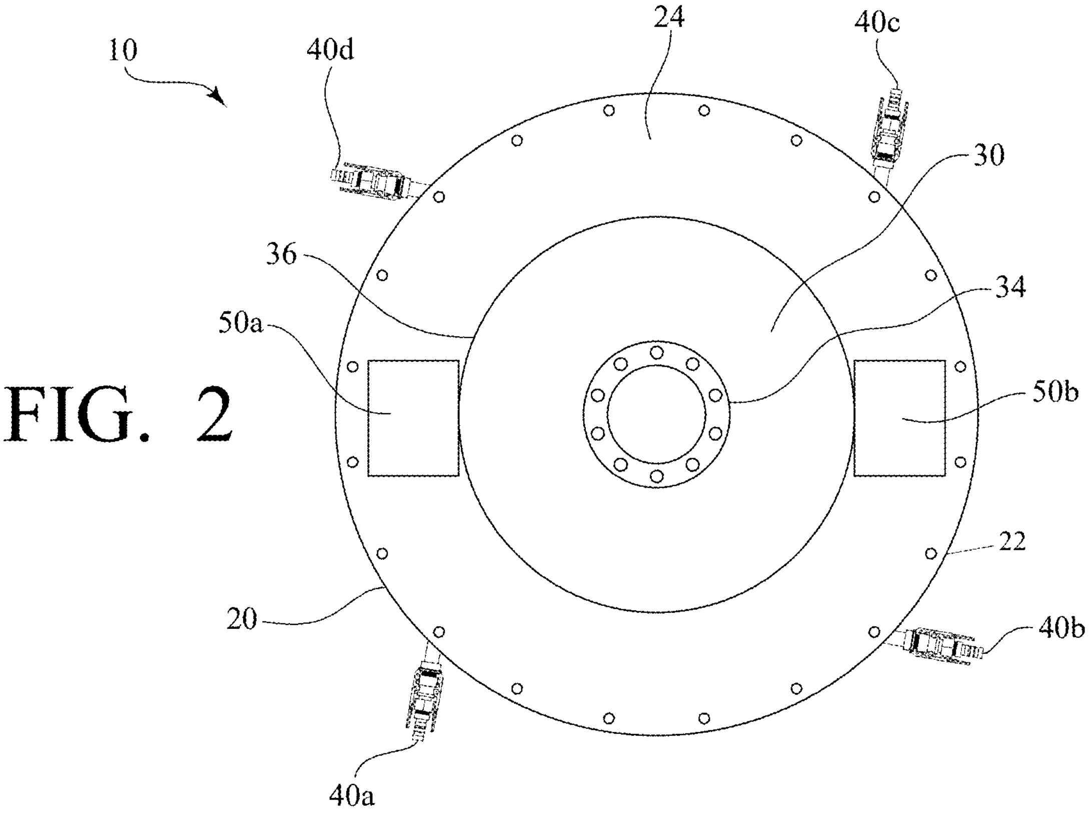
FIG. 2 is a top view of the apparatus of FIG. 1.
Figure 3:
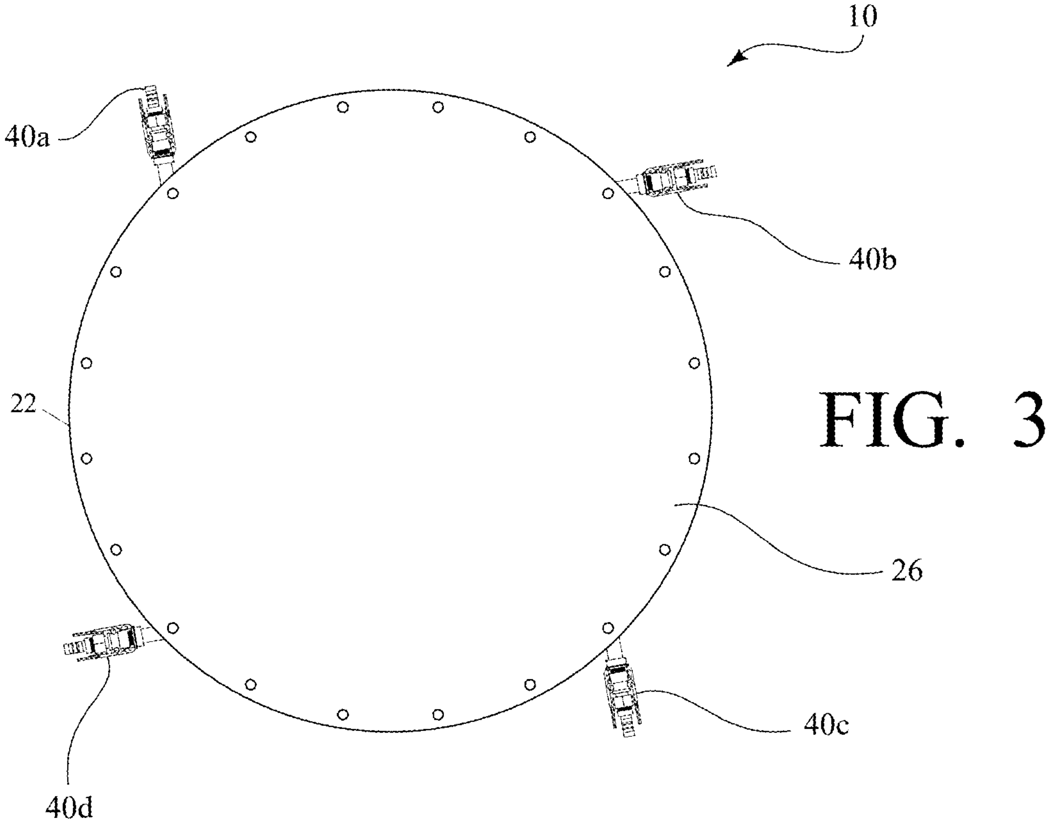
FIG. 3 is a bottom view of the apparatus of FIG. 1.
Figure 4:
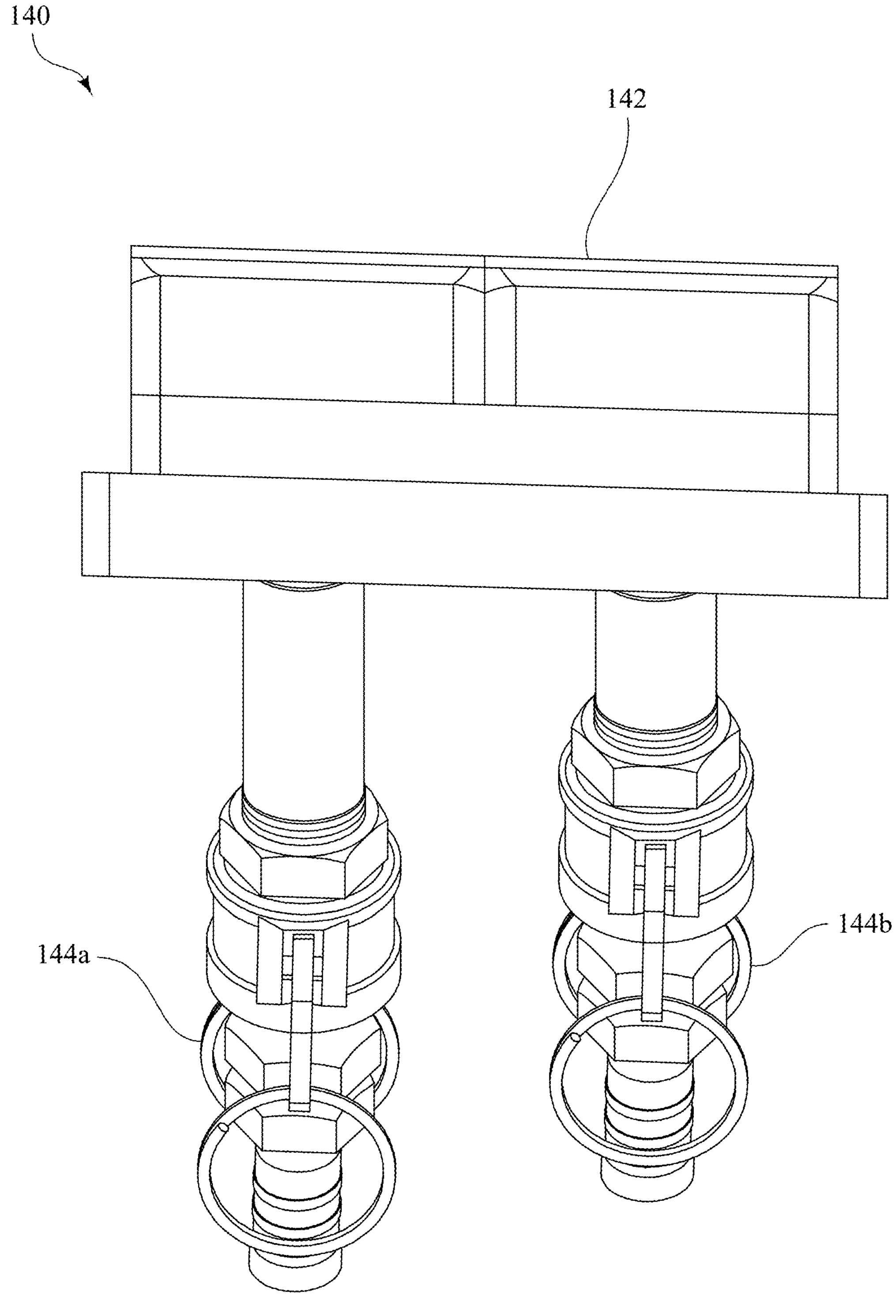
FIG. 4 is a detailed view of an air knife assembly included in an exemplary vortex air flow material grinding apparatus made in accordance with the present invention.
Figure 5:
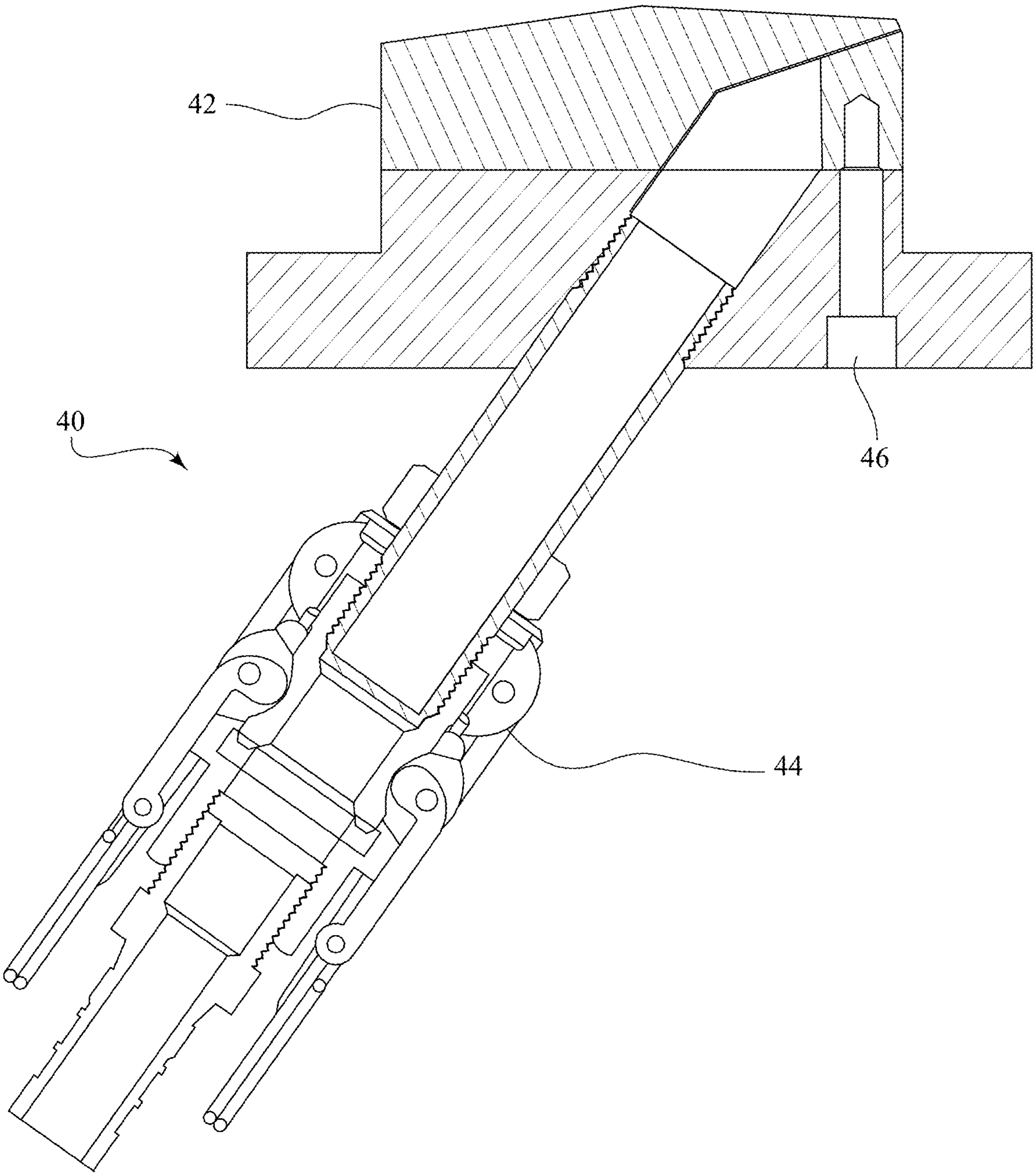
FIG. 5 is a detailed view of another air knife assembly included in an exemplary vortex air flow material grinding apparatus made in accordance with the present invention.

Referring now to FIGS. 1-3, in one embodiment of the present invention, a vortex air flow material grinding apparatus 10 is provided that comprises a cylindrical lower chamber 20 having an annular side wall 22, a upper surface 24, and a lower surface 26 having a dome shape. The annular side wall 22, the upper surface 24, and the lower surface 26 of the lower chamber 20 collectively define an open interior of the lower chamber 20, with the upper surface 24 of the lower chamber 20 then further defining a central opening 28. An upper chamber 30 including a conical sidewall 32 defining an upper opening 34 and a lower opening 36 is then operably connected to and in fluid communication with the central opening 28 of the lower chamber 20. In this way, the upper chamber 30 can thus be described as having an inverted conical shape as the lower opening 36 of the upper chamber 30 has a greater circumference than the upper opening 34 of the upper chamber 30.

To introduce material into the apparatus 10, material consisting of igneous, sedimentary, and metamorphic rocks, minerals or mineraloid matter, and other materials containing rare earth and other valuable elements and compounds, which generally has been be previously crushed to approximately 2×0 inch or less, is fed into the lower chamber 20 through one or more airlocks in the form of rotary valves 50*a*, 50*b* positioned in the top enclosure plate forming the upper surface 24 of the lower chamber 20 and proximate to the annular side wall 22 and adjacent to where the lower chamber 20 and upper chamber 30 meet. The air locks or rotary valves 50*a*, 50*b* are typically supplied with pre-crushed raw material by a hopper and auger conveyor system (not illustrated), and are configured so that a minimum volume of airflow escapes from the lower chamber 20 when material is fed into the lower chamber 20.

To inject air into the apparatus 10, compressed air is piped or otherwise introduced or injected into two or more typically teardrop-shaped air injection portals equipped with air injection mechanisms similar to, and referred herein as, air knife assemblies 40*a*, 40*b*, 40*c*, 40*d*, which are located in the annular sidewall 22 of the lower chamber 20. The injection portal or air knife assemblies 40*a*, 40*b*, 40*c*, 40*d* include a deflection or air injection plate 42 with an extremely small cross-sectional area that can be oriented to force compressed air to flow, in a clockwise or counterclockwise direction, and create a high-speed vortex inside the lower chamber 20 that extends upward into the inverted, conical upper chamber 30. In this regard, when air is injected into the lower chamber 20 subsequent to the introduction of material into the lower chamber 20, the material becomes entrained in an airflow vortex and is tumbled against itself, pulverizing it into a fine powder while simultaneously dehydrating the material. When the desired size has been achieved by retaining or otherwise processing the material in the air vortex for a period of time, a control valve 52 positioned at and operably connected to the upper opening 34 of the upper chamber 30 can then be opened or, alternatively, a size classifying mechanism such as an air classifier can be engaged, to allow the pulverized material of desired size to exit the apparatus 10, such as through a conduit 54 operably connected to the upper opening 34 of the upper chamber 30, into a collection device for further classification, separation, and extraction of rare earth and other valuable elements and compounds.

By making use of the vortex air flow material grinding apparatuses made in accordance with the present invention, material sizing can, among other ways, be controlled by: making adjustments to air pressure and air volume via the air knife assemblies 40*a*, 40*b*, 40*c*, 40*d*; controlling the size and feed rate of material thru the rotary valves 50*a*, 50*b*; and by adjusting the control valve 52 positioned at the top of the upper chamber 30. The angle of the conical sidewalls 32 of the upper chamber 30 and the cross-sectional area and other properties of the air knife assemblies 40*a*, 40*b*, 40*c*, 40*d* can also be modified to adjust the size reduction of materials with various compositions and physical properties.

Moreover, as described above, the apparatus 10 includes and utilizes a dome shaped indention on the base plate or lower surface 26 of the lower chamber 20. The dome shape included in the lower surface 26 improves vortex airflow by directing particles that migrate toward the center of the baseplate or lower surface 26 into the central airflow, toward the annular sidewall 22, and into the vortex airflow, while also minimizing accumulation of material towards the bottom of the lower chamber 20. The height and diameter of the dome on the bottom enclosure plate or lower surface 26 can of course be varied relative to the diameter of the plate or lower surface 26 in order to optimize economical and efficient size reduction of the material being crushed to the desired finished product size.

As a refinement to the present invention, and referring now more generally to FIGS. 1-5, the apparatuses made in accordance with the present invention are believed to provide an advantage over existing vortex air flow grinders and similar apparatuses in that the exemplary apparatuses described herein improve vortex airflow by utilizing replaceable air injection plates 42, 142 and one or more air injection nozzles 44, 144*a*, 144*b*, which, again, are collectively referred to herein as air knives or air knife assembles 40, 140. In some embodiments, and as described in further detail below, the number, orientation, depth of intrusion into the cylindrical lower chamber 20, deflection angle, volume of airflow, shape of the deflection plate, and other physical properties of the air knives 40, 140 can be readily modified to improve the pulverizing of materials by replacing individual air knives with multiple knives, by replacing mounting plates, or by incorporating adjustment mechanisms into the mounting plates and knives. For instance, in some embodiments and as perhaps best shown in FIG. 5, an adjustable tap 46 can be located at the airflow exit point of the air knife assembly 40 to modify the airflow while the apparatus is operating. In this regard, it is appreciated that the air knives are often subject to rapid wear when mineral particles strike them, and thus, the ability to easily remove and replace individual knives is a factor in maximizing the economical operation of the vortex air grinder apparatus 10 of the present invention.

Further, and without wishing to be bound by any particular theory or mechanism, it is believed that the presently-described apparatuses are superior to existing apparatuses by virtue of the improved vortex airflow grinding and pulverizing achieved by inverting the conical upper chamber 40 and placing it on top of the annular lower chamber 20. The inverted vortex that is created by this configuration increases the rotational velocity and number of collisions when material is drawn upward moving into progressively smaller cross sections of the conical upper chamber 30. Also, when approaching the top of the conical upper chamber 30, the largest sized particles tend to move downward and reenter the vortex airflow at a lower level, allowing for continued cycles of acceleration and collisions until they are approximately equal in size to the smallest particles. Additional fluid dynamic effects resulting from inverting the conical upper section 30 thus enhance pulverization and optimize the economics, efficiency, and simplicity of the apparatus 10 for classification, separation, and extraction of rare earth elements and compounds and other valuable elements, compounds, and minerals.

As a further refinement to the apparatus 10, it is contemplated that the various rotary and control valves 50*a*, 50*b*, 52, air knife assemblies 40*a*, 40*b*, 40*c*, 40*d*, and other variables and adjustable mechanisms can be operated manually or automatically, onsite or remotely, in real time during operation or when the apparatus 10 is idle, using various known types of sensors, such as, e.g., temperature sensors, flow sensors, pressure sensors, or particle size and concentration sensors. Moreover, it is also contemplated that the interior dimensions of the apparatus 10, the angles of sidewalls 22, 32, the size and design of the air knife assemblies 40*a*, 40*b*, 40*c*, 40*d*, the shape and size of the domed base plate or lower surface 26, and other physical properties of the apparatus 10 are interrelated and can be proportionately scaled to achieve a desired pulverization. For example, an exemplary apparatus made in accordance with the present invention that is eight feet in height can process an exponentially greater volume of material per hour than a four foot device; however air pressure, sidewall angles, valve size, and all other variables must be modified so as to maintain and optimize the airflow vortex and pulverization of materials in such a larger device. In this regard, it is appreciated that the capacity of the nano-pulverizer units described herein are scalable to almost any desired quantity, with average expected throughput limited primarily by the availability of compressed air necessary to maintain an airflow vortex and by economies of scale.

With further regard to the materials introduced into an exemplary apparatus made in accordance with the present invention, the desired feedstock size is typically 2 inch by 0 or less but can be varied depending on material. In turn, the material introduced into the device can then be crushed or pulverized to various sizes by modifying variables and adjustable mechanisms. In some exemplary implementations, the finished product (i.e., the processed material) size ranges from 60 mesh (250 μm) to less than 400 mesh (37 μm). In some implementations, by making use of the apparatuses and methods described herein, the economical, efficient, and direct pulverization of the raw material by an exemplary apparatus to less than 325 mesh (44 μm) results in particles containing valuable elements and compounds which may be added to mixing tanks to create a feedstock liquid slurry, or may be transported in a dry state, for further processing so that rare earth elements and compounds and other valuable elements and compounds may be economically classified, separated, and extracted.

As indicated above, and referring now to FIGS. 2-5, in one embodiment of the apparatuses described herein, the air knife assemblies can broadly be described as being teardrop-shaped with a bulbous plenum which tapers down to a precise air discharge slot having an average coefficient of discharge of approximately 0.95 (95% efficient). The teardrop-shaped air knife assembly provides higher impact air velocity in the direction in which the air is directed with the lowest demand on air compressors. To increase the speed and force of the airflow vortex, one to four air knives (such as the four air knife assemblies 40*a*, 40*b*, 40*c*, 40*d* shown in FIGS. 2-3) may be mounted to the lower chamber 20 with base plates attached around the circumference of the annular side wall 22 and typically spaced at an equal distance from one another and from 30 degrees to 180 degrees apart. The air knife assemblies 40*a*, 40*b*, 40*c*, 40*d* are generally oriented at the same angle relative to the annular side wall 22 of the lower chamber 20 and are configured to generate clockwise or counterclockwise airflow. If desirable, individual air knife assemblies can also be oriented and supplied with sufficient air pressure to introduce reverse flows in specific areas of the vortex. Individual knives and groups of air knife assemblies can also have different characteristics to improve the pulverization of materials. For instance, the air knife assemblies can be configured so as to generate multiple concentric vortex structures, such as a triple concentric vortex structure composed of a first, second, and third individual vortex within the chambers, resulting in complex tangential velocity distributions and particle collisions. The configuration of air knives can also be adjusted or modified when the device is not in operation or dynamically during operation.

In one embodiment of the apparatuses described herein, when not in operation or dynamically during operation, the shape of the internal walls in the annular lower chamber, the conical upper chamber, or both, may be constructed or refitted with irregular raised areas, baffles, protrusions, and other surface elements designed to alter the vortex airflow so as to increase the frequency and force of collisions, and the efficiency of pulverization, and/or to reduce the final product size. The size and shape of the openings between the chambers, the vertical location of the air knife assemblies relative to the lower base end and to each other, the cross-sectional size and number of raw material input portals, the size and shape of the openings through which pulverized material is withdrawn from the chambers, and other physical characteristics of the chambers and mechanisms can be altered to increase the efficiency of pulverization and reduce the final product size without departing from the spirit and scope of the present invention.

In one embodiment, magnetic fields, ultrasonic pulses, plasma, gases, and other forms of energy and matter can also be utilized during the operation of an exemplary apparatus to disrupt, redirect, energize, chemically alter, or physically alter the vortex airflow and entrained particles to improve the pulverization of material. The airflow and entrained particles can be modified, modulated, and adjusted utilizing a feedback system of sensors and analytic devices that measure and monitor size, velocity, turbulence, cohesion, and other physical properties of the particles, elements, compounds, and airflow dynamics.

In one exemplary embodiment, the temperature, pressure, and composition of the compressed air or other gaseous substance injected into an exemplary apparatus can be varied during operation to alter the velocity, airflow dynamics, and other physical characteristics of the vortex and entrained particles. Material can be fed through an air lock mechanism into an airflow created so as to have a substantial velocity before being introduced into the cyclonic vortex portion of the apparatus. The airflow and entrained particles can be modified, modulated, and adjusted utilizing a feedback system of sensors and analytic devices that measure and monitor size, velocity, turbulence, cohesion, and other physical properties of the particles, elements, compounds, and airflow dynamics.

In one embodiment, material may be reprocessed through the device one or more times, or in a continuous cycle, by creating a transport pipe loop from the finished product exit (e.g., through the conduit 54 in FIG. 1) to the feed input (e.g., the rotary valves 50*a*, 50*b*) for further processing until the desired size of the materials has been achieved. The apparatus utilized in this embodiment may be configured with multiple devices in series (stacked) or parallel, some of which may be of the downward flowing conical type and some of which may be the upward flowing inverted conical type. As desired, additional cycles of processing may incorporate: repositioned and/or replaced baffles and other mechanical elements; adjustable non-mechanical elements; various combinations of pressure, temperature, and velocity; and other alterations, modifications, and additions which improve the pulverization as may be identified by the automated and manual monitoring of the particle size at the output control valve of an exemplary apparatus, such as the control valve 52 shown in FIG. 1.

It is further contemplated that particles may be selected for continued processing by the insertion of a measurement device, such as an air classifier utilizing the Coanda effect, between the finished product exit (e.g., through the conduit 54 in FIG. 1) and the feed input (e.g., the rotary valves 50*a*, 50*b*) so as to continue to reprocess only those particles which are above a specified size. If the reprocessing through the apparatus is continuous, the loop is created by piping which is of size and length such that when the finished product exit (e.g., the conduit 54 in FIG. 1) and the feed input (e.g., the rotary valves 50*a*, 50*b*)) are open, including configurations where an air classifier is utilized, a relatively unimpeded circular airflow path is established. In the continuous configuration, particles of the desired size can also be withdrawn and the introduction of raw material to the cycle can be controlled.

In one embodiment, and as an even further refinement, it is contemplated that an exemplary apparatus can be configured with a single annular chamber having openings on the top and bottom which may be opened or closed with valves or other mechanisms that classify and select particles based on size. A lower conical chamber can then be attached to the bottom opening of such an annular chamber and an upper inverted conical chamber can be attached to the upper opening of the annular chamber. The upper conical chamber has an opening on the topmost (farthest end from the annular chamber) and the lower conical chamber has an opening on the bottommost (farthest end from the annular chamber) which may be opened or closed with valves or other mechanisms. Particles may be selected for continued processing by the insertion of a measurement device, such as an air classifier utilizing the Coanda effect, so as to continue to process only those particles which are above a specified size. The airflow and entrained particles may be modified, modulated, and adjusted utilizing a feedback system of sensors and analytic devices that measure and monitor size, velocity, turbulence, cohesion, and other physical properties of the particles, elements and compounds, and airflow dynamics which open and close valves and other mechanisms such that processing may occur in any combination and sequence in the annular and lower conical chamber; the annular and upper conical chamber; the annular and both the lower and upper conical chambers; or in a continuous loop cycle through the annular and both the lower and upper conical chambers utilizing piping to connect the topmost end of the upper chamber to the bottommost end of the lower chamber.

It should be appreciated, and is within the scope of the disclosure, to utilize every step or element or only a select few as may be valuable to certain extra elements but not others. However, embodiments of device and method may be utilized in systems to recover approximately forty different elements through the various steps and components, and to separate out fifteen distinct rare earth elements in the process. Most of the product recovered by the systems will be in a concentrate and will range from about 40% to about 90%. This may also include precious metals and heavy metals.

The foregoing descriptions of possible implementations consistent with the present disclosure does not represent a comprehensive list of all such implementations or all variations of the implementations described. The description of some implementations should not be construed as an intent to exclude other implementations described. For example, artisans will understand the present specification as describing how to implement the disclosed embodiments in many other ways, using equivalents and alternatives that do not depart from the scope of the disclosure. Moreover, unless indicated to the contrary in the preceding description, no particular component described in the implementations is essential to the invention. It is thus intended that the embodiments disclosed in the specification be considered illustrative, with a true scope and spirit of invention as described herein.

What is claimed is:

1. A vortex air flow material grinding apparatus, comprising:

a cylindrical lower chamber including an annular side wall, an upper surface, and a lower surface, the annular side wall, the upper surface, and the lower surface of the lower chamber collectively defining an open interior of the lower chamber, and the upper surface further defining a central opening;

an upper chamber including a conical sidewall defining an upper opening and a lower opening, the conical sidewall decreasing in circumference along the entire lateral surface of the upper chamber as the conical sidewall extends from the lower opening to the upper opening such that the upper chamber has an inverted conical shape with the lower opening having a greater circumference than the upper opening, the conical sidewall terminating at the upper opening for allowing ground material to exit the apparatus at the upper opening, and the lower opening mounted on top of and in fluid communication with the central opening of the lower chamber such that the upper chamber is positioned entirely above the lower chamber;

one or more air knife assemblies operably connected to the annular side wall of the lower chamber, the one or more air knife assemblies for injecting air into the open interior of the lower chamber to thereby create a vortex air flow in the lower chamber that extends upward into the upper chamber; and a control valve operably connected to and positioned at the upper opening of the upper chamber, the control valve for allowing ground material to exit the apparatus.

2. The apparatus of claim 1, wherein the one or more air knife assemblies comprises four air knife assemblies, each one of the four air knife assemblies spaced an equal distance away from an adjacent one of the four air knife assemblies.

3. The apparatus of claim 1, wherein each of the one or more air knife assemblies includes an air injection plate and one or more air injection nozzles, each air injection plate oriented to force compressed air to flow in a clockwise or counterclockwise direction inside the lower chamber.

4. The apparatus of claim 3, wherein each of the one or more air knife assemblies includes an adjustable tap to modify a flow of air into the open interior of the lower chamber.

5. The apparatus of claim 3, wherein each of the one or more air injection nozzles are configured to inject air into the open interior of the lower chamber at the same angle relative to the annular side wall of the lower chamber.

6. The apparatus of claim 3, wherein the one or more air injection nozzles comprises at least two air injection nozzles.

7. The apparatus of claim 1, wherein the upper surface of the lower chamber further includes one or more air locked openings for delivery of material into the lower chamber, the one or more air locked openings positioned on the upper surface of the lower chamber proximate to the annular side wall of the lower chamber.

8. The apparatus of claim 7, wherein each of the one or more air locked openings comprises a rotary valve.

9. The apparatus of claim 1, further comprising a conduit operably connected to the upper opening of the upper chamber and to the control valve, the conduit for transporting ground material away from the apparatus.

10. The apparatus of claim 1, wherein the bottom surface of the lower chamber is in the shape of a dome and extends upward into the open interior of the lower chamber.

11. A method for grinding a material, comprising:

introducing a material into an apparatus including a cylindrical lower chamber including an annular side wall, an upper surface, and a lower surface, the annular side wall, the upper surface, and the lower surface of the lower chamber collectively defining an open interior of the lower chamber, and the upper surface further defining a central opening, an upper chamber including a conical sidewall defining an upper opening and a lower opening, the conical sidewall decreasing in circumference along the entire lateral surface of the upper chamber as the conical sidewall extends from the lower opening to the upper opening such that the upper chamber has an inverted conical shape with the lower opening having a greater circumference than the upper opening, the conical sidewall terminating at the upper opening for allowing ground material to exit the apparatus at the upper opening, and the lower opening mounted on top of and in fluid communication with the central opening of the lower chamber such that the upper chamber is positioned entirely above the lower chamber, one or more air knife assemblies operably connected to the annular side wall of the lower chamber, the one or more air knife assemblies for injecting air into the open interior of the lower chamber to thereby create a vortex air flow in the lower chamber that extends upward into the upper chamber; and a control valve operably connected to and positioned at the upper opening of the upper chamber, the control valve for allowing ground material to exit the apparatus;

injecting an amount of compressed air into the cylindrical lower chamber to create an air vortex in the lower chamber extending upward into the inverted conical-shaped upper chamber, such that introduced material entrained in the air vortex tumbles against itself and is pulverized; and processing the material in the air vortex for a period of time sufficient to pulverize the material to a desired size.

12. The method of claim 11, wherein introducing the material into the apparatus comprises introducing the material through one or more rotary valves operably connected to the lower chamber.

13. The method of claim 11, further comprising a step of, prior to introducing the material into the apparatus, pre-crushing the materials.

14. The method of claim 11, further comprising a step of, subsequent to processing the material in the air vortex, removing the material from an opening in the upper chamber.

15. The method of claim 11, wherein, subsequent to processing the material in the air vortex, the material has a diameter of less than about 325 μm.

16. The method of claim 15, wherein, subsequent to processing the material in the air vortex, the material has a diameter of about 37 μm to about 250 μm.

17. The method of claim 11, wherein the material comprises coal, clay, or rock materials.

18. The method of claim 11, wherein the material is selected from the group consisting of carbonite materials, alkaline igneous materials, ion-adsorption clay deposits, and monazite-xenotime-bearing placer deposits.

19. The method of claim 11, wherein the material comprises coal.

* * * * *